United States Patent [19]
Soler et al.

[11] 3,708,025
[45] Jan. 2, 1973

[54] METHOD AND APPARATUS FOR SELECTING OBJECTS TO BE FORMED INTO GROUPS

[75] Inventors: Federico Martínez Soler; Jacintó Salvado Gómez, both of Barcelona, Spain

[73] Assignee: Mateo Grau Hijos, S.A., Barcelona, Spain

[22] Filed: Sept. 21, 1971

[21] Appl. No.: 182,460

[30] Foreign Application Priority Data

Sept. 21, 1970  Spain........................384,171

[52] U.S. Cl. ................177/1, 177/70, 177/122, 209/121
[51] Int. Cl. ..........................G01g 19/22
[58] Field of Search .....177/1, 70, 122, 123; 209/121

[56] References Cited

UNITED STATES PATENTS

| | | | |
|---|---|---|---|
| 3,557,889 | 1/1971 | Rejsa | 177/123 X |
| 3,073,399 | 1/1963 | Durand | 177/122 X |
| 2,727,733 | 12/1955 | Carswell | 177/70 |

Primary Examiner—Allen N. Knowles
Assistant Examiner—Gene A. Church
Attorney—Lyon & Lyon and Christen & Sabol

[57] ABSTRACT

Method and apparatus for classifying a supply of objects having a common characteristic, such as size or weight, which is randomly distributed throughout the individual objects into groups in which the total value of all of the objects in each group will be the same, in which the random supply is divided into types having narrow ranges of said values, and the final groups are selected from the subdivided groups according to prearranged programs which are designed to utilize more of the objects which predominate in the random supply at the time the groups are selected.

21 Claims, 5 Drawing Figures

METHOD AND APPARATUS FOR SELECTING OBJECTS TO BE FORMED INTO GROUPS

The present invention relates to a method and apparatus for counting similar objects previously classified into classes with respect to size, weight or any other characteristics.

More particularly, the invention relates to a method and apparatus specially suitable for carrying out the operations to be performed during an automatic or semi-automatic continuous packing process of oranges or other analogous objects previously classified by weight, immediately before the step of packing these objects into a bag.

It is apparent that in such a process, according to which the oranges are generally packed into bags containing a predetermined weight thereof, the step immediately prior to the packing step must be the selecting of a certain number of oranges which, together, have the weight desired for each bag, whereby generally an error range of ± 2 percent is permitted.

For this purpose it is sufficient to previously calculate the approximate average weight of the oranges and to take the necessary number of oranges in order to obtain the previously desired weight. Obviously, however, it would practically be impossible to attain the correct weight when the number of oranges is not very high, since in most of the cases the established error range of ± 2 percent would largely be surpassed. In practice, however, this is the most frequent case, since the approximate average weight of an orange ranges between 150 and 300 g., so that the number of oranges usually contained in a bag holding 1 kg thereof varies between six and three.

To avoid this disadvantage it is already known to arrange the oranges in groups previously classified by weight, so that when a desired combination is selected, comprising a predetermined number of oranges of each different weight group, this combination provides a total number of oranges which exactly weigh the previously established weight or at least remain within the permitted error limits. This system has the drawback that, assuming that the classification of the oranges is made in groups of 10, in increments of 10 grams, the number of groups used in the combination is much smaller than the total number thereof, so that a great number of oranges will remain unpacked unless the selected combination is changed from time to time, which is very difficult to achieve with the known methods.

In addition, assuming that the installation to carry out an automatic packing process of oranges is provided with means to continuously feed oranges, it is possible that the oranges fed will define a distribution range over the established groups which considerably departs from a standard distribution, which means that among the oranges fed there may be a much higher number of them in one or more of the groups compared to the remainder, or else that one or more groups may not include any oranges.

The object of the present invention is to provide a method and apparatus capable of offering a plurality of combinations or programs as well as an automatic and instantaneous control of the feeding of the oranges, which leads to the packing device, so that there is always a minimal number of oranges in each one of the groups and that the entry of oranges into the counting apparatus is interrupted as soon as there is more than one group having a number of oranges exceeding a predetermined maximal amount.

Basically, the method according to the invention is characterized by the steps of guiding each class of objects having similar, or analogous characteristics into respective independent feeding channels, predetermining respective maximal and minimal numbers of objects in each channel, positioning respective sensing devices in each channel to report when the predetermined maximal and minimal numbers of objects are exceeded, whereby each sensing device sends a signal to a first electronic circuit which orders the start of the counting process when all channels have at least the minimal number of objects and at least one channel has the maximal number of objects, and wherein the first electronic circuit stops the feeding of objects when more than one channel has the maximal number of objects, and transmits the signal of the respective sensing device of the maximal number of objects to a second electronic circuit which commands a counting device to carry out a counting program previously selected from several programs by the second electronic circuit, whereby the counting device subsequently releases a certain number of objects per channel, according to said program.

An apparatus according to the invention to carry out this method essentially comprises a plurality of feeding channels provided each with respective sensing devices for the maximal and minimal numbers of objects contained therein. These sensing devices may comprise respective micro-switches which send their signals to a first electronic circuit, and are also connected to a second electronic circuit including a program selector device having as many different programs as different feeding channels are provided on the apparatus.

According to another feature of the apparatus of the invention each channel of the counting device is provided with a pivoted end portion having a plurality of successive restraining elements susceptible of being withdrawn, independently from each other, from their restraining positions to permit free passage of the objects, being again returned to their restraining positions before a new counting cycle is started.

According to a further feature of the invention the pivoted end portion and the movable restraining elements are controlled by impulses independent from each other and sent by said second electronic circuit, with the exception of the restraining element most distant from the pivoted end portion, which is fixed.

Other features and advantages of the invention will be apparent from the following description of a preferred embodiment of the apparatus of the invention applicable, for example, for packing oranges into bags, in connection with the attached drawings, in which.

Figure 2:
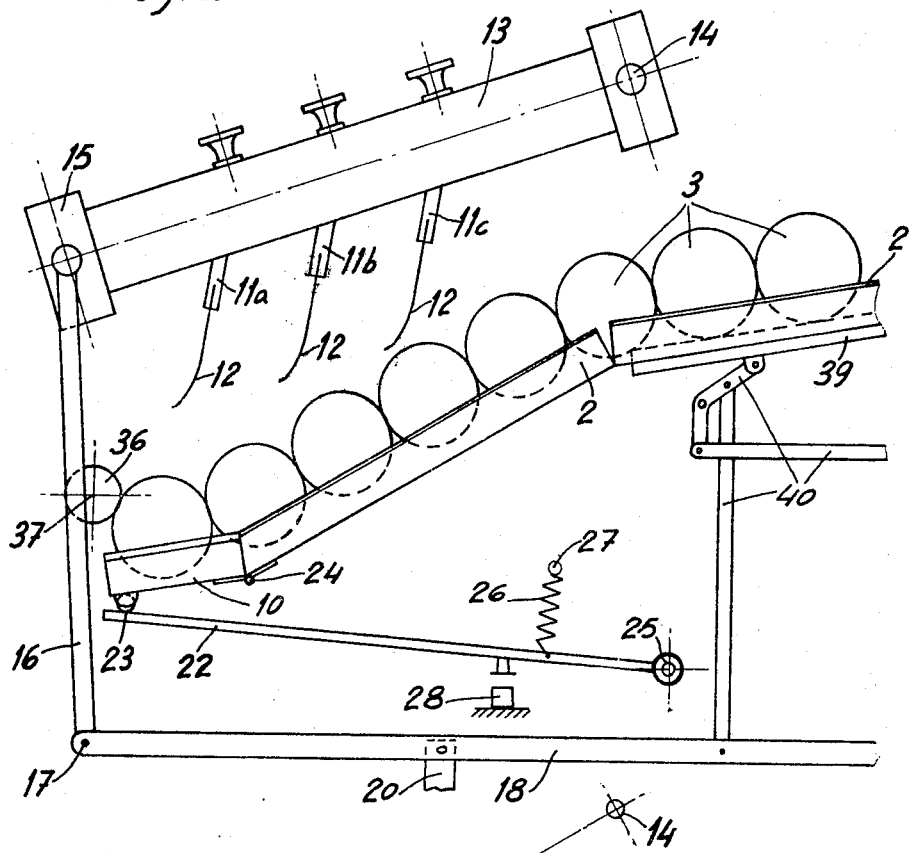
FIG. 2 is an enlarged schematic side view of a channel of the counting device, having its pivoted end portion in an elevated position.
Figure 3:
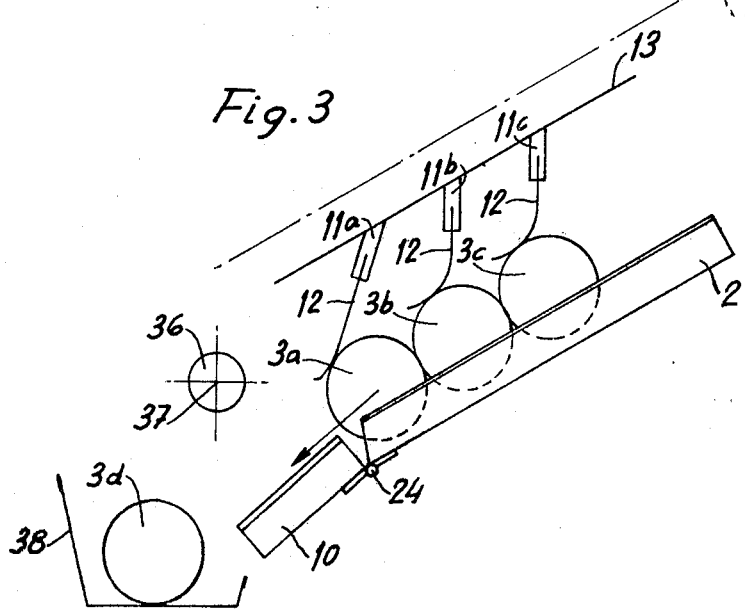
FIG. 3 shows the same channel of FIG. 2, also in an enlarged schematic side view, but in a position for releasing two oranges.
Figures 4, 5:
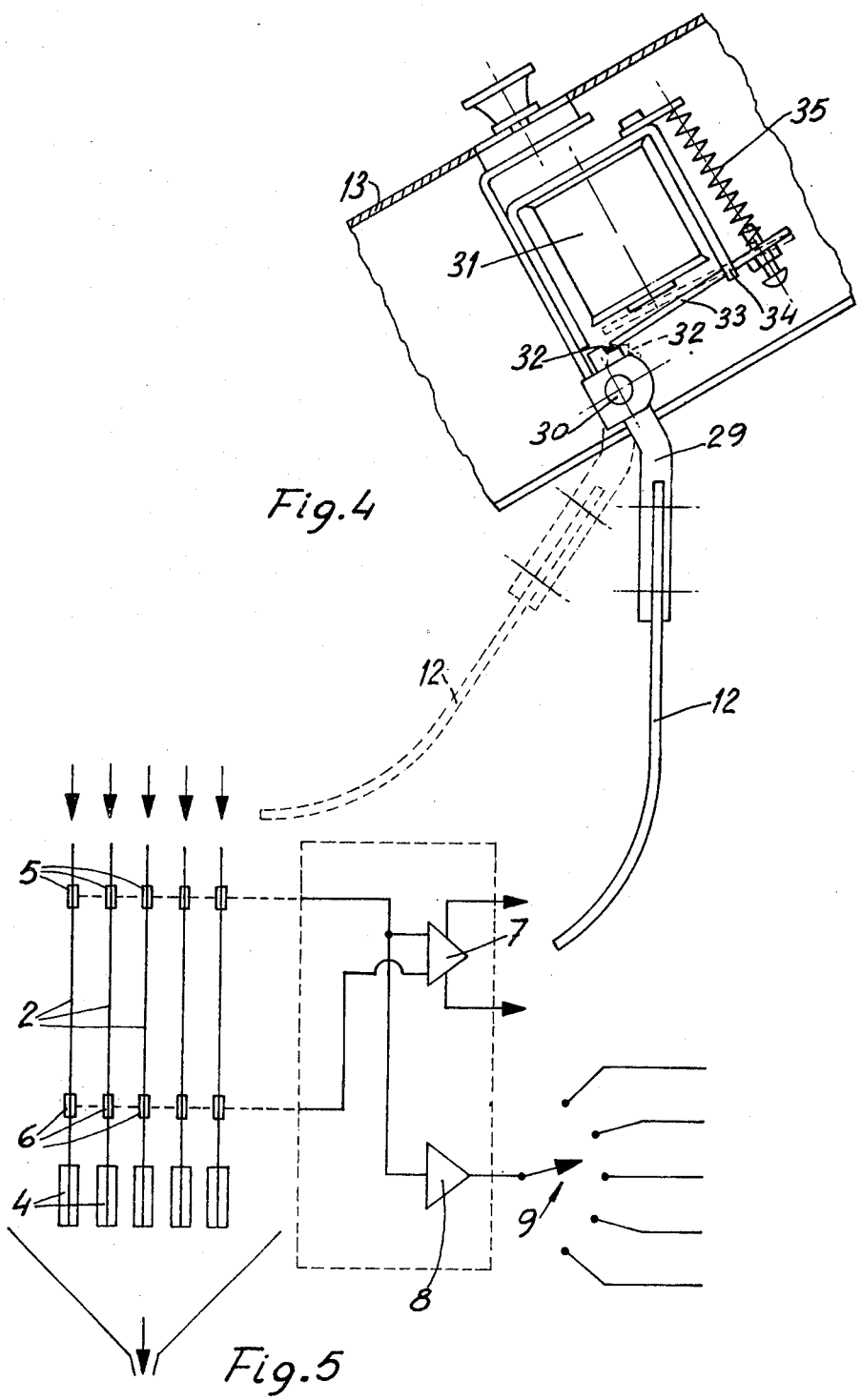
FIG. 4 is a further enlarged side view of one of the restraining elements.
FIG. 5 is a diagram indicating the operation of the process.

Referring now more particularly to the drawings the apparatus according to the invention comprises a frame structure 1 carrying five feeding channels 2 mounted thereon, which guide the oranges 3 (only shown in FIGS. 2 and 3 for purposes of a better understanding of the function of the apparatus) to the counting device 4 schematically shown in FIGS. 2 and 3. The channels 2 are each provided with respective sensing devices 5 and 6 for reporting the presence of maximal and minimal numbers of objects, respectively, located in the channels and which may comprise microswitches, photoelectric cells, or other known devices, which send their signals to a first electronic circuit 7 (FIG. 5). The sensing devices 5 for the maximal number of objects in each channel are additionally connected to a second electronic circuit 8 which includes an automatic program selector 9 having as many different programs as feeding channels 2 are provided on the apparatus, that is: five different programs in the present example.

Each channel 2 of the counting device 4 is provided with a pivoted end portion 10 and with three restraining elements 11a, 11b and 11c, in the example illustrated in the drawings, each of the restraining elements including a flexible bar 12 secured to an overhead arm 13. The number of arms 13 corresponds to the number of channels 2 and are mounted for rotation around an axis 14 fixed to the frame 1 of the apparatus when the ends 15 of the arms 13 are simultaneously lifted or lowered by means of a link 16 pivotally connected at 17 to one end of a lever 18. The lever 18 is pivoted at its other end to a pivot point 19 of the frame structure and is actuated by the link 20 which cooperates with a crank 21 connected to a rotary driving means, such as an electric motor, schematically represented by numeral 21a.

The pivoted end portions 10 are lowered and elevated as a result of the corresponding lowering or elevating movements of respective levers 22 associated therewith. The lower parts of the portions 10 rest on these levers 22 by means of small rollers 23. The portions 10 can rotate about respective hinges 24 when the levers 22 rotate about respective pivot points 25, while each lever 22 is constantly subjected to the action of a tension spring 26 secured to a fixed point 27 of the frame structure 1 and which urges the lever 22 to remain in its elevated position, so that the corresponding pivoted end portion 10 also remains in its elevated position. The lowering movement of each lever 22 is accomplished by activating a respective electromagnet 28, the magnetic force of which overcomes the action of the corresponding spring 26 when the magnet is actuated by means of an impulse sent by the second electronic circuit 8.

Figure 1:
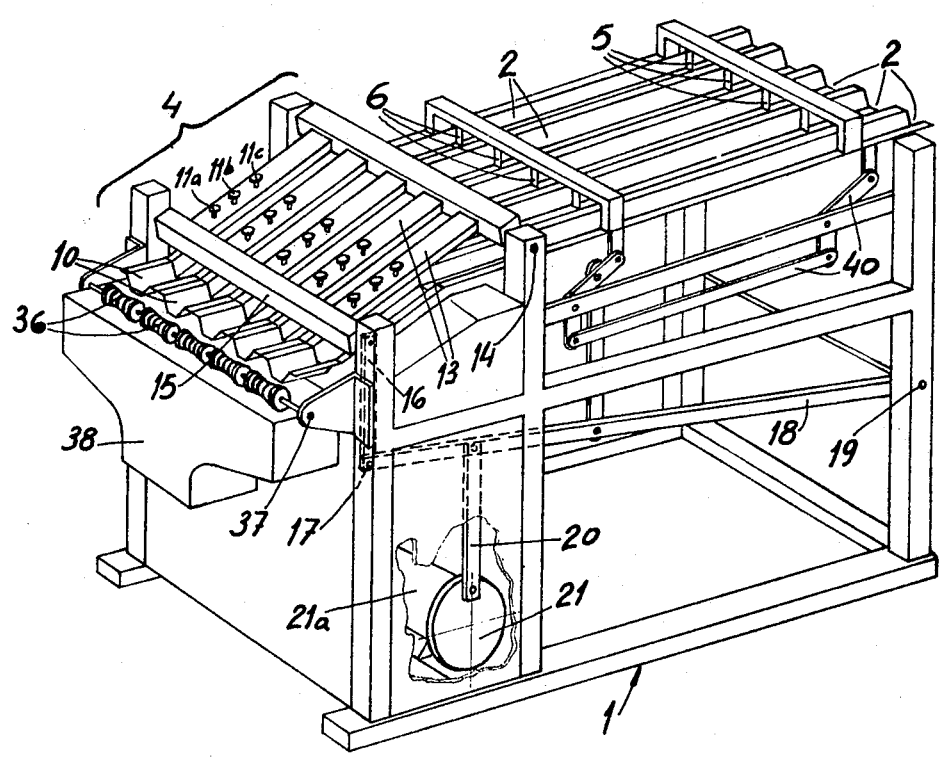
FIG. 1 is a perspective view of the apparatus of the invention.

FIG. 4 shows the details of a movable restraining element such as the restraining elements 11a and 11b, shown in FIGS. 1, 2 and 3; the element 11c being fixed.

The flexible bar 12 is fixedly secured to a leg 29 pivotally connected at 30 to the frame of an electromagnet 31 secured to the arm 13. The end of leg 29 opposite to the bar 12 is provided with a step 32 which permits the leg 29 to be blocked by means of a lever 33 which rests at 34 on the frame of the electromagnet 31 and is subjected at its end opposite to the leg 29 to the continuous action of a tension spring 35 as shown in solid lines in FIG. 4. However, when the electromagnet 31 receives an impulse, the lever 33 is attracted by the magnet and its free end is withdrawn from the step 32 of the leg 29, so that the flexible bar 12 is unblocked to move to the position shown in broken lines in FIG. 4.

Each pivoted end portion 10 as well as each movable restraining element 11a, 11b is actuated by independent impulses sent by the second electronic circuit 8 (FIG. 5), whereas the restraining elements 11c are fixedly secured to their respective arms 13.

In the present embodiment the oranges are fed to the channels 2 and move along the same by gravity. However, it is apparent that any other type of feeding means could be provided without altering the essence of the invention.

The first and second electronic circuits 7 and 8, respectively, may be formed of printed circuit plates comprising several gates and amplifiers preferably utilizing silicon semiconductors.

A set of restraining rollers, generally indicated by reference numeral 36, are freely rotatably mounted on the frame on a fixed axis 37. A collector is indicated by numeral 38, and a device, known per se, to improve the advancement by gravity of the objects located in the channels 2, as will be described later on, is indicated by numerals 39 and 40.

The apparatus to realize the method of the present invention works as follows:

The oranges 3, previously classified by weight into five classes, are guided into the five feeding channels 2. Respective maximal and minimal numbers of objects are predetermined to be received in each channel and the respective sensing devices 5 and 6 are positioned at the desired locations to signal when the predetermined maximal and minimal numbers of oranges are attained, in which cases each sensing device 5, 6 sends a signal to the first electronic circuit 7 (FIG. 5) which commands the start of the counting operation when all the channels 2 have at least the minimal number of oranges and at least one of the channels has the maximal number of oranges. The first electronic circuit also commands the stopping of the feeding process if there is more than one channel 2 with the maximal number of oranges. The signal of the corresponding sensing device 5 of the maximal number of oranges is also sent to the second electronic circuit 8 which commands the counting device 4, by actuating the motor 21a driving crank 21 and by sending corresponding impulses to the electromagnets 31 and 28 which respectively control the restraining elements 11a and 11b and the pivoted portions 10, to carry out a counting program previously selected from several programs by the second electronic circuit 8, after which the counting device 4 releases a certain number of oranges from each channel 2, according to said program.

Thus, for example, in FIG. 2 the arm 13 and the pivoted end portion 10 are in elevated position, while the oranges 3 are supported in channel 2 by the corresponding roller 36 which is freely rotatable around the axis 37 fixed to the frame structure 1.

FIG. 3 shows the position in which the arm 13 and the pivoted portion 10 are lowered, while the first orange 3d has fallen into the collector 38 and the following orange 3a starts to roll down since the restraining element 11a is released, whereas the orange 3b is held back by the restraining element 11b which remains blocked.

Once the objects to be fed to the apparatus of the invention have been previously classified by weight into classes, the programs are adapted to furnish completely predetermined weights in each counting operation, which are calculated by means of arithmetic combinations of the unit weights corresponding to the weight of objects of each feeding channel.

Subsequently, a numeric example is given for a better understanding of the invention.

EXAMPLE

It is assumed that the channels A, B, C, D and E are provided with oranges having weights of approximately 150, 160, 170, 180 and 190 g., respectively, that each count of six oranges has to result in a total weight of 1,000 g., plus 10 g. for shrinkage up to the moment of consumption, that only four programs have been introduced corresponding to the channels A, B, C, and D, and that the sensing device 5 of the maximal number of channel E is disconnected, so that channel E will only be used as an auxiliary to compose the programs in case the maximum corresponds to channel A or channel B. Thus, according to the program selected by the second electronic circuit 8, one of the subsequently specified counts will result:

PROGRAM A (Signal to release oranges from counting device 4 into collector 38 initiated by maximal sensing device 5, of channel A.)

| | |
|---|---|
| 3 oranges of channel A: | 3 × 150 = 450g |
| 2 oranges of channel E: | 2 × 190 = 380g |
| 1 orange of channel D : | 1 × 180 = 180g |
| | TOTAL: 1,010g |

PROGRAM B (Signal initiated by sensing device 5, of channel B)

| | |
|---|---|
| 3 oranges of channel B: | 3 = 160 = 480g |
| 2 oranges of channel C: | 2 × 170 = 340g |
| 1 orange of channel E : | 1 × 190 = 190g |
| | TOTAL: 1,010g |

PROGRAM C (Signal initiated by sensing device 5, of channel C)

| | |
|---|---|
| 3 oranges of channel C: | 3 × 170 = 510g |
| 2 oranges of channel B: | 2 × 160 = 320g |
| 1 orange of channel D : | 1 × 180 = 180g |
| | TOTAL: 1,010g |

PROGRAM D (Signal initiated by sensing device 5, of channel D)

| | |
|---|---|
| 3 oranges of channel D: | 3 × 180 = 540g |
| 2 oranges of channel B: | 2 × 160 = 320g |
| 1 orange of channel A : | 1 × 150 = 150g |
| | TOTAL: 1,010g |

Thus, it will be obvious that the purpose of the minimal sensing devices 6 is to ensure that all of the channels in the counting device 4 are filled prior to the release of any objects to the collector 38 so that whatever program of grouping is selected in response to a signal from one of the maximal sensing devices 5, there will be sufficient objects in each channel to comply with that program. On the other hand, the purpose of the maximal sensing devices 5 is to ensure that the program selected will utilize more of the objects falling into the classification of the channel in question, since the channel in which the maximal sensing device 5 is first to initiate the signal to actuate the counting device 4 will obviously contain the class of articles which is most numerous at the time the counting device is actuated.

The advantage of this system is its flexibility, because it immediately adapts to changes in the proportions of objects being classified. For example, in the packaging of a large shipment of oranges, the initial "run" may include a disproportionate quantity of large size, or weight, oranges, causing the selection of program A more frequently than not. If, however, during such a "run" there should suddenly appear an extremely large proportion of smaller oranges, the programs would immediately be shifted to release groups of articles to collector 38 in which the predominant portion, numerically, would be the smaller oranges.

Furthermore, the electrical connections for the various circuits have not been shown in detail in the drawings for the sake of clarity but it should be obvious that arrangements to enable the sensing devices 5 and 6 to actuate the circuits 7 and 8 are well known and capable of accomplishment by those skilled. It should also be obvious that, since the programs A, B, C, and D merely require in each case that the circuits for predetermined sets of electromagnets for the restraining devices be energized in response to a specific signal, the design of storage and actuating circuits to accomplish this is well within the scope of the prior art, as well as triggering circuits to energize the motor 21a and the electromagnetic 28 in proper sequence.

The above described apparatus can also be used as a simple counting device of unclassified objects, if the program selector is replaced by simple commutators adapted to determine the number of elements which are to be included in each count.

The method and apparatus of the present invention permit, prior to the counting operation, to carry out an operation which provides for complete automation in the control of the object feeding process depending upon the variable characteristic according to which the objects have been previously classified. In the present case, involving the packing of oranges, previously classified by weight into groups, an extremely high production speed can be attained which is only limited by the initial weighing operation of the oranges. With apparatus according to the invention, provided with five channels and grouping the required oranges in each count to obtain a weight of 1 kg, a possible production would be approximately 1,800 kg per hour, which is considerably higher than the quantity which an operator could pack with a semi-automatic bag closing machine.

Another of the main advantages of the apparatus of the invention resides in the fact that there is practically no mechanical wear, since the movements of the movable parts are very short and the mechanical stress is small, while the electronic components of the apparatus are not subjected to any wear at all.

It is apparent that variations can be made and accessories be included in the apparatus of the invention, such as for instance in the feeding system, without altering the essence of the invention. Thus, a device can be provided to facilitate the advancement by gravity of the oranges and to prevent obstructions in the channels 2, whereby, according to a known embodiment, this device may consist of a bar 39 longitudinally arranged within the center of each channel 2 and periodically subjected to a vertical reciprocating movement originated by the lever assembly 40.

Other modifications and improvements may be made in the apparatus which would be obvious to those skilled in the art which would come within the scope of the invention.

We claim:

1. Method of classifying a supply of randomly distributed similar objects, each having a common characteristic which ranges between a predictable maximal value and a predictable minimal value for each object, and arranging selected pluralities of said objects into groups in which the sum of the values of said common characteristic of all of the objects in each group is approximately the same, comprising the steps of subdividing the range of said predictable maximal and minimal values into a plurality of fractional increments to define a plurality of classes of said objects, each said class of objects having individual values of said common characteristic which falls within the range of a particular increment defining the class, providing a plurality of different programs for selecting objects to comprise one of said groups of objects, each said program containing a different proportion of objects from different classes, subdividing said randomly distributed objects into said classes prior to arrival at a selection point, accumulating said subdivided objects at said selection point, selecting one of said programs in accordance with the proportionate number of objects of different classes accumulated, and selecting the number of objects of each class designated by the selected program from the accumulated objects.

2. The method of claim 1, wherein the common characteristic of said objects is their weight.

3. The method of claim 1, which includes the steps of feeding said objects to said selection point in sequence, and a predetermined number of each class of said objects is accumulated prior to the selection of one of said programs.

4. The method of claim 3, which includes the steps accumulating a predetermined minimal number of objects of all classes and a predetermined maximal number of objects of one class prior to the selection of one of said programs.

5. The method of claim 4, which includes the steps of providing at least one program which designates a preponderance of articles of one class to be selected to form a group, and selecting said program when the maximal number of objects of that class has been accumulated.

6. The method of claim 5, which includes the steps of providing a plurality of said programs each designating a preponderance of articles of a different class, and selecting the program in which the preponderance of objects designated corresponds to the class of which the maximal number of objects has been accumulated.

7. The method of claim 6, wherein the common characteristic of said objects is their weight.

8. In apparatus for classifying a supply of randomly distributed similar objects, each having a common characteristic which ranges between a predictable maximal value and a predictable minimal value for each object, and arranging selected pluralities of said objects into groups, said range of predictable values being subdivided into a plurality of fractional increments to define a plurality of classes of said objects, the improvement which includes a plurality of channels for independently sequentially conveying objects of each of said respective classes, means to accumulate pluralities of said objects at a selection point, sensing means to detect the presence of a preponderance of objects of any one class thus accumulated, and means to selectively release a plurality of different combinations of classes of objects from said selection point to form successive ones of said groups.

9. Apparatus defined in claim 8, wherein said means to selectively release said combinations of objects includes electronic circuit means responsive to said sensing means.

10. Apparatus defined in claim 9, wherein said electronic circuit means includes a plurality of predetermined programs, each of said programs being respectively actuated in response to detection of a preponderance of objects of a particular class.

11. Apparatus defined in claim 10, wherein said sensing means includes means cooperating with each of said channels to detect a predetermined minimal number of objects and a maximal number of objects accumulated in said channel, and said electronic circuit means includes first circuit means connected with all of said means to detect objects in said channels to provide a signal when all of said channels have accumulated the minimal number of objects and one channel has accumulated a maximal number of objects, and second circuit connected with said first circuit means, all of said maximal object detecting means and said releasing means, said second circuit including means to select a plurality of predetermined programs corresponding to the number of classes of objects, and to select the corresponding program to release a group of objects in response to a signal from one of said maximal object detecting means.

12. Apparatus defined in claim 8, wherein said sensing means includes first and second electrical switching means for each of said channels, each of said first switching means being actuated by the presence of an accumulation of a predetermined minimal number of objects in the channel, each of said second switching means being actuated by the presence of an accumulation of a predetermined maximal number of objects in the channel, and circuit means connecting all of said first and second switching means to provide an electrical signal when all of said first switching means and at least one of said second switching means have been actuated.

13. Apparatus defined in claim 12, wherein said means to selectively release objects includes a plurality of electrically operable restraining means for each of said channels, each of said restraining means being movable between a first position to immobilize an object accumulated in the channel at the selection point and a second position to release said object, said restraining means being arranged to immobilize objects successively positioned in the channel, whereby the number of objects released from each channel is controlled by the number of restraining means actuated to said second position.

14. Apparatus defined in claim 13, wherein said restraining means are normally positioned in said first position, and are connected in said circuit means connecting said switching means to provide said electrical signal, said circuit means also including means to actuate at least one of said restraining means to said second position when said signal has been provided.

15. Apparatus defined in claim 14, wherein said circuit means includes means selectively responsive to the signal provided by each of said second switching means to actuate selectively predetermined arrangements of pluralities of said restraining means to their respective second positions.

16. Apparatus defined in claim 13, wherein said channel for accumulating objects are inclined to induce movement of said articles in one direction by gravity, and said means to accumulate objects includes mounting means for said restraining means movable between a first position and a second position, said restraining means including an arm supported by said mounting means for contact with an object in a channel when said mounting means and said restraining means are both in their first positions, said arm being out of possible contact with an object when said mounting means is in said second position, whereby when said mounting means is in said second position objects can freely accumulate in said channels.

17. Apparatus defined in claim 16, wherein said restraining means include electromagnetic devices mounted on a framework, said framework being pivotally mounted at one end, and electric motor means connected with said one end to raise and lower said framework.

18. Apparatus defined in claim 16, wherein said means to accumulate objects includes means disposed at the lowermost end of each of said channels movable between a first position to block the movement of an object in the channel and a second position for unobstructed movement of an article.

19. Apparatus defined in claim 18, wherein said means to block movement of an object includes an element pivotally mounted at the extremity of a channel, and a second element mounted at said extremity and coacting with said pivotally mounted element in said second position to block said movement.

20. Apparatus defined in claim 19, wherein said means to block movement of an object includes electrical actuating means to move said pivotally mounted element between said two positions.

21. Apparatus defined in claim 20, wherein said electrical actuating means includes circuit means controlling the actuating means to release objects from the channels when said restraining means are positioned to release objects in accordance with a predetermined program.

* * * * *

UNITED STATES PATENT OFFICE
CERTIFICATE OF CORRECTION

Patent No. 3,708,025          Dated January 2, 1973

Inventor(s) Federico Martínez Soler and Jacinto Salvadó Gómez

It is certified that error appears in the above-identified patent and that said Letters Patent are hereby corrected as shown below:

In item [72] correct the accent marks in the following inventor's name to read --Jacinto Salvadó Gómez--.

Correct the assignee's name in item [73] to read --MATEO GRAU E. HIJOS, S.A.--.

Correct the attorney to read --Christen & Sabol--.

Signed and sealed this 29th day of May 1973.

(SEAL)
Attest:

EDWARD M. FLETCHER, JR.
Attesting Officer

ROBERT GOTTSCHALK
Commissioner of Patents